United States Patent [19]

Pitchford

[11] Patent Number: 5,070,982
[45] Date of Patent: Dec. 10, 1991

[54] POWER TAKE-OFF ENGAGEMENT MECHANISM

[75] Inventor: Trevor Pitchford, Bolton, England

[73] Assignee: Eaton Corporation, Cleveland, Ohio

[21] Appl. No.: 681,836

[22] Filed: Apr. 8, 1991

[30] Foreign Application Priority Data

Apr. 12, 1990 [GB] United Kingdom ............... 9008424

[51] Int. Cl.$^5$ ............... B60K 17/28; F16D 11/14; F16D 25/061
[52] U.S. Cl. ............... 192/67 R; 192/85 A; 74/11; 74/15.66
[58] Field of Search ............ 192/67 R, 85 R, 85 A; 74/11, 15.6, 15.66, 15.8, 15.82, 15.84, 15.86, 15.88; 180/53.1, 53.6, 53.7

[56] References Cited

U.S. PATENT DOCUMENTS

| | | | |
|---|---|---|---|
| 2,438,539 | 3/1948 | Cook | 74/11 |
| 2,761,322 | 9/1956 | Ronan | 74/15.86 |
| 2,958,225 | 11/1960 | Wagner | 74/15.4 |
| 3,587,331 | 6/1971 | Moss | 74/11 |
| 3,830,111 | 8/1974 | Travaglio | 74/15.4 |
| 4,388,843 | 6/1983 | Teeter | 74/745 |
| 4,573,366 | 3/1986 | Kennard | 192/67 R X |
| 4,589,293 | 5/1986 | Mori | 74/15.6 |
| 4,773,277 | 9/1988 | Cook et al. | 74/15.8 X |

FOREIGN PATENT DOCUMENTS

| | | |
|---|---|---|
| 357580 | 3/1990 | European Pat. Off. . |
| 943157 | 5/1956 | Fed. Rep. of Germany . |
| 2497879 | 7/1982 | France . |
| 2087026 | 5/1982 | United Kingdom . |

*Primary Examiner*—Richard Lorence
*Attorney, Agent, or Firm*—H. D. Gordon

[57] ABSTRACT

A pneumatic PTO engagement mechanism (100) is provided having a feed shaft which (18) passes through a central bore in the input PTO gear (2) in known manner and which is rotationally and axially fixed in the PTO housing (1). The PTO input gear is slidable and rotatable over the shaft, an intermediate seal (28) enables this; and a coil spring (23) to resist engagement of the PTO acts directly on the piston (26) and is received in a blind bore (12A) in the input shaft.

6 Claims, 2 Drawing Sheets

POWER TAKE-OFF ENGAGEMENT MECHANISM

BACKGROUND OF THE INVENTION

1. Related Applications

This application claims priority under 35 USC 119 from GB 9008424.5 filed Apr. 12, 1990.

2. Field of the Invention

The present invention relates to power take-off (PTO) engagement mechanism by which a driven PTO shaft can be engaged or disengaged with a rotating input shaft communicating with a power source, e.g. a driving shaft of a heavy duty vehicle change gear transmission. Since PTO's often transmit large amounts of power, e.g. at temporary sites for operating or winching large and/or heavy duty equipment, the required parts, splines, etc., of the engagement mechanism must be robust and accordingly often use pressurized fluid such as pneumatic power to actuate the toothed clutching members that engage and disengage the PTO.

More particularly, the present invention relates to a pressurized fluid actuated PTO engagement mechanism of the type comprising a driving input shaft, a coaxial driving gear independently rotatable of said input shaft and selectively axially movable into and out of engagement therewith and a driven gear constantly meshing with said driving gear and in driving relationship with the PTO output shaft.

3. Description of the Prior Art

Selectively engageable and disengageable PTO devices driven off heavy duty (i.e. truck) vehicular transmissions are, of course, well known in the prior art as may be seen by reference to U.S. Pat. Nos. 4,388,843; 3,830,111; 2,958,225; 2,761,322 and 2,438,539, the disclosures of which are hereby incorporated by reference.

One prior art PTO engagement mechanism involves an axially fixed shaft rotating with and within a bore in the PTO input gear, the shaft having a longitudinal conduit to conduct pressured fluid to an operating chamber, and a piston axially driven by the pressure at the chamber and taking the gear with it against a disengaging bias to a position of engagement with the rotating input shaft.

Accordingly, the state of the art is a PTO engagement mechanism comprising a housing, a PTO input gear mounted therein with sliding and rotational freedom, a piston fixed to the gear and drivable axially by a pressure chamber formed at the end of a center drilled shaft until a meshing part of the gear (i.e. a first jaw clutch member) meshes with a cooperatingly meshing part (i.e. a second jaw clutch member) of an input shaft. The center drilled shaft passes through a central bore in the gear, a conduit in the shaft is proved to introduce and vent pressurized air to and from the pressure chamber and a return bias is proved acting to resist engaging movement of the gear.

The above-described prior art arrangement, described in greater detail hereinafter, uses many parts, seals, 0-rings, bearings. It is desirable to provide an improved mechanism which will, compared to the prior art, reduce the number of parts, weight, length (always at a premium in mobile machinery) and/or of leak paths of high pressure fluid or oil.

SUMMARY OF THE INVENTION

In accordance with the present invention, the drawbacks of the prior art are minimized by the provision of a pressurized fluid actuated PTO engagement mechanism of the type comprising an axially slidable PTO input gear selectively movable against a bias from a position of disengagement to a position of engagement with an input shaft wherein pressurized fluid is supplied through a rotationally fixed support shaft and the number of parts and/or required axial length of the mechanism are reduced compared to the prior art devices.

The above is accomplished by providing a shaft which is axially and rotationally fixed relative to a PTO housing for connection to a source of pressurized fluid and for conducting pressurized fluid to a piston chamber for applying an axial force to the PTO input gear. Further, the biasing spring tending to disengage the PTO is located between the PTO actuating piston and a blind bore in the input shaft, which blind bore is surrounded by the external axial clutch tooth splines on the input shaft so that additional axial space for the disengagement spring is minimized or eliminated.

Compared to the prior art structures, the structure of the present invention avoids an end bearing for the pressure feed shaft, avoids seals, and utilizes the splined length of input shaft for the spring. Moreover, the pressure feed shaft, being relatively fixed, can be coupled into directly, without special provision of a rotary air connector, i.e. another part, which has to be fixed. Also the overall housing according to the invention does not need to accommodate an intermediate chamber between a rotary connector and the rotating shaft, with such chamber having to be sealed.

Accordingly, it is an object of the present invention to provide a new and improved PTO engagement mechanism which is more reliable, requires fewer parts and/or is more axially compact, all as compared to existing prior art structures.

Further objects, features and advantages of the present invention will appear from the following description of an embodiment thereof, given by way of example, in conjunction with the drawings.

DESCRIPTION OF THE PREFERRED EMBODIMENT

Figure 1:
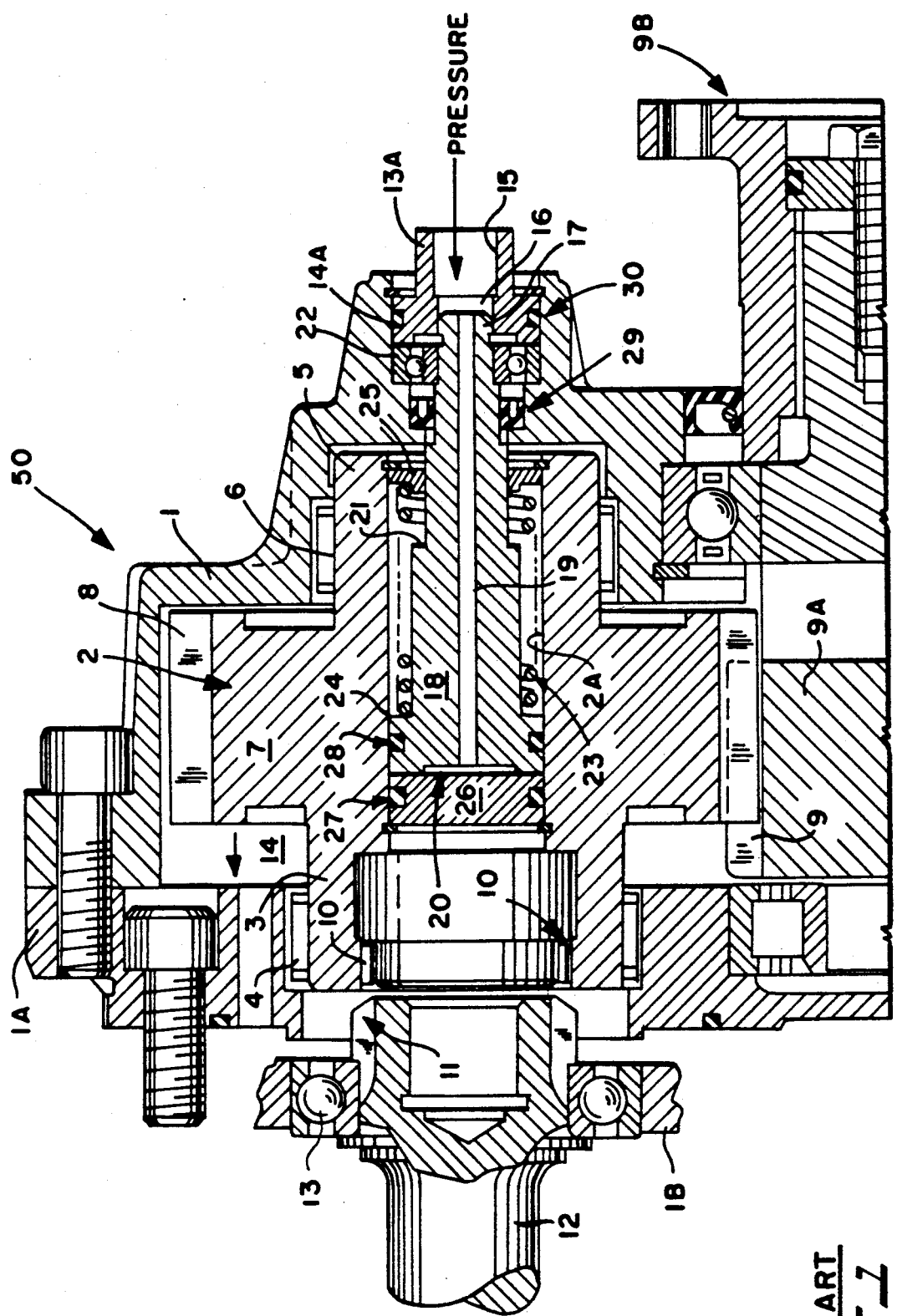
FIG. 1 shows an elevational, partially sectioned view of the above-mentioned prior art PTO engagement mechanism.

The prior art PTO engagement mechanism discussed above is illustrated in FIG. 1. This prior art mechanism is currently publicly used and sold by the Hydrocar SPA Company of Italy (Models 2214 and 2216) and constitutes the current state of the art.

The prior art mechanism 50 comprises a first PTO housing in part 1 in which rotates a PTO input gear 2, which has a power input end 3 supported by a bearing 4 in a second PTO housing part 1A, an opposite end 5 supported by a bearing 6 in housing part 1, and a central portion 7 having peripheral gear teeth 8 which are constantly in mesh with peripheral gear teeth 9 of a PTO output gear 9A for driving a PTO output shaft 9B. Internal clutch teeth or splines 10 on gear 2 are shown disengaged from external clutch teeth or splines 11 on an input shaft 12 rotating in a bearing 13 in a rear casing 1B of a transmission (not shown). PTO housing parts 1, 1A allow space 14 for gear 2 to move leftwards as viewed, for axial engagement of splines 10 and 11. PTO input shafts and transmissions having same may be seen by reference to above-mentioned U.S. Pat. No. 4,388,843.

Engagement is as follows in this prior art; an air connection 13A accommodated in a bore 14A in the housing part 1, itself has a bore 15 by which pneumatic pressure from a source (not shown) is conveyed to an intermediate chamber 16. The left end of chamber 16 lies adjacent the end 17 of a rotating conduit shaft 18 which has an axial center drilled type pneumatic conduit 19 leading pressure to an operating chamber 20 which is a disc shaped counter-bored depression formed in the end of conduit shaft 18 to maximize the leftward force applicable to a piston 26 for a given pneumatic pressure.

The conduit shaft 18 is supported by and rotates with input gear 2, and is also supported and located axially against pressure in chamber 20 and against leftward movement of the PTO input gear 2 by a fixed bearing 22 in the housing. When the input gear 2 is driven leftwardly by pressure at 20 by means to be described, it is resisted and returned on cessation or exhaust of the pressure by a return coil spring 23 which surrounds shaft 18 and acts between a shoulder 24 on shaft 18 and a stop washer 25 clipped to the input gear 2. Stop washer 25 will engage the shoulder 21 and hold the gear from further leftward movement when the clutch teeth 10 and 11 are fully engaged.

The extreme rightward position in the prior art mechanism 50 of the PTO input gear is that shown, where a piston 26, also clipped to input gear 2, abuts the left end of the conduit shaft 18 and is exposed to pressure when applied at chamber 20.

Upon pressurization of chamber 20, via conduit 19, chamber 16 and connector 15, the piston 26 is driven leftwardly and takes input gear 2 with it into full meshing engagement with the input shaft 12. Stop washer 25 then engages shoulder 21 and coil release spring 23 is now compressed.

With the PTO engaged, the following parts rotate, input gear 2, piston 26, seals 27, 28, conduit shaft 18, spring 23 and stop washer 25.

A fixed seal 27 and an axially moving (relative to the inner diameter surface 2A of input gear 2) seal 28 contain the pressure in chamber 20; an oil seal 29 prevents oil leaving, and compressed air entering, the housing and PTO. An 0-ring 30 prevents compressed air escaping to atmosphere. As aforesaid, the above operates well, but desirably has fewer parts and less axial length, bulk, weight and possibility of air leaks.

Figure 2:
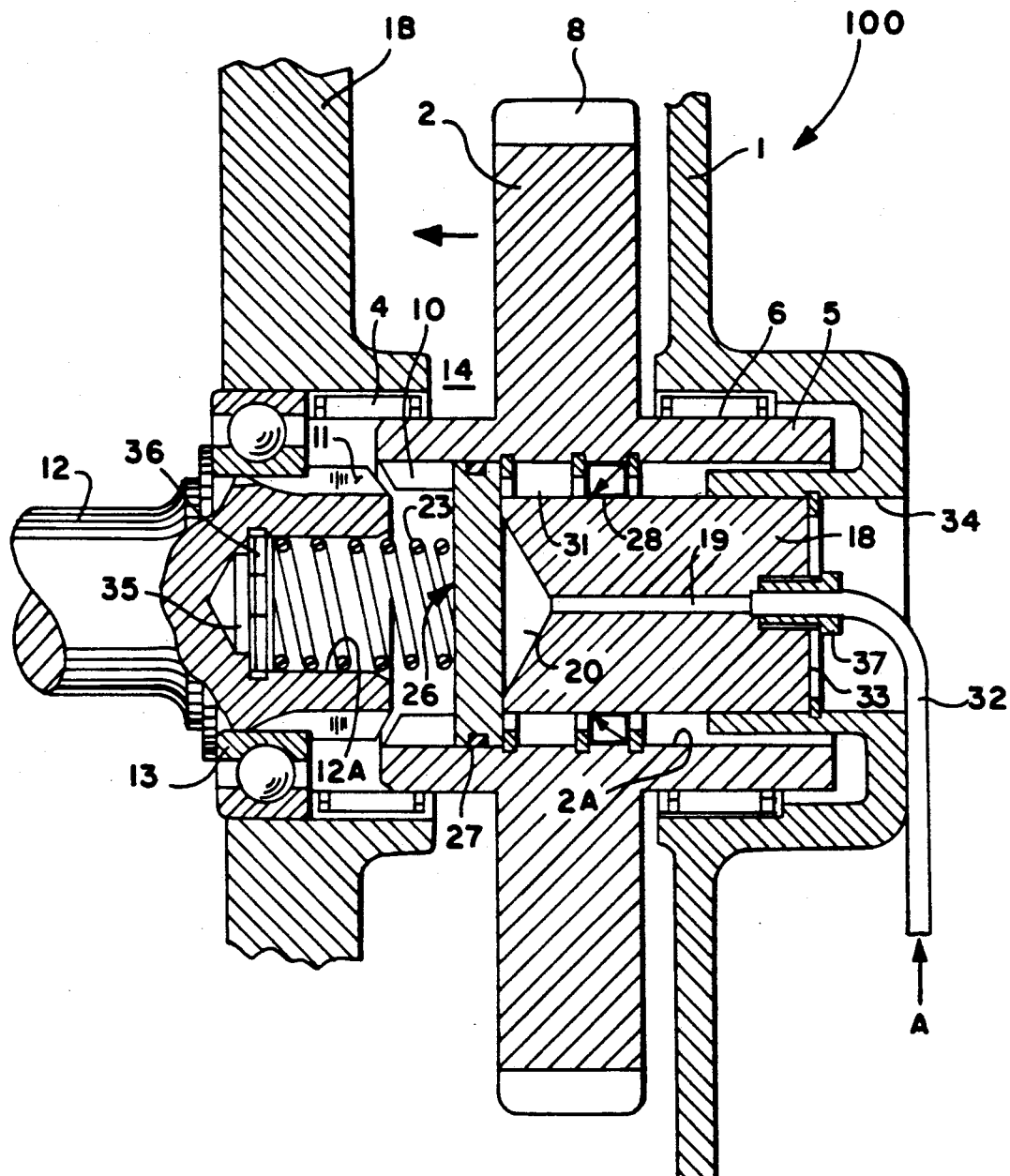
FIG. 2 shows an elevational, partially section view of the PTO engagement mechanism of the present invention.

The structure of the PTO engagement mechanism 100 of the present invention may be seen by reference to FIG. 2. In describing the structure of mechanism 100, parts having similar or identical structure and/or function to parts of prior art mechanism 50 will be assigned like reference numerals. Referring to FIG. 2, the PTO output gear constantly meshed with input gear 2, and the PTO output shaft driven thereby, are not shown.

The major differences between the mechanism 100 of the present invention and the prior art mechanism 50 are that the center drilled or hollow conduit, also called pressure feed shaft, 18 does not rotate in housing, the return spring 23 acting on the PTO input gear 2 acts on the piston 26 instead of directly on the gear, and the axially moving seal 28 now has to accept rotational as well as axial relative movement. Accordingly, the seal 28 is attached to the inner diameter bore 2A of input gear 2 instead of to shaft 18, and an annular space 31 has to be provided for, in the retracted position shown of gear 2, to allow the leftward movement of the annular seal 28. When the piston 26 begins to be driven leftward by compressed air from feedpipe 32 reaching conduit 19 and pressure chamber 20, the annular space 31 will absorb some of the compression and indeed apply it to resist seal 28. This latter effect is, however, relatively small, and only minimally prejudicial.

Because shaft 18 does not rotate in the housing 1, its right end 33 can be held by a re-entrant portion 34 of the PTO housing part 1. This re-entrant portion 34 accommodates the bearing 6 and the axial extension 5 of the gear when in its rightward disengaged position. Compared to the prior art structure 50, no axial space for accommodating a bearing 22, or seals 29 and 30 for the shaft, or an intermediate chamber 16, or a fixed insert 13A for application of pressure, is necessary; thus saving considerable axial length. Return spring 23 now acts between the piston 26 and the end 35 of a recess or blind bore in the input shaft 12. A bearing cylindrical roller or other suitable thrust bearing 36 must be interposed between the spring 23 and the end 35, because the spring does not rotate with the input shaft until the splines engage. Such a bearing is unnecessary in the prior art structure of FIG. 1 because relatively rotating parts are not acted on by spring 23 in prior art mechanism 50.

As before, pressure in chamber 20 drives piston 26 leftward, overcoming the bias of spring 23, which takes with it input gear 2 still nonrotating until splines 10 engage clutch tooth splines 11 and piston 26 abuts the annular inner end of the input shaft 12. Now seal 28 prevents air leaking into the housing and the following parts rotate with the input shaft; input gear 2 and the output gear (now shown) meshed therewith, piston 26, spring 23, thrust bearing 36 and oil/air seal 28; but shaft 18 as aforesaid remains stationary.

Disengagement occurs as soon as pressure ceases to be applied and is exhausted at chamber 20, because spring 23 forces the piston rightwards to abut shaft 18. The resulting rightward movement of input gear 2 and seal 28 causes spines 10 to disengage splines 11, and PTO drive ceases.

Not only is axial length and bulk saved,, for example, 95 mm (including an air pipe connector 37) instead of 152 mm, but also, the following six items of prior art mechanism 50 as illustrated in FIG. 1, namely: connector 13, chamber 16, 0-ring 30, bearing 22, O-ring 28 and stop washer 25 are not required in mechanism 100 of the present invention. Extra parts required for the PTO engagement mechanism 100 of the present invention are only two: thrust bearing 36, and re-entrant portion 34 of housing part 1. In this embodiment, there is no separate housing part 1A, but this is a mere matter of design choice for reasons unconnected with the invention. Indeed the PTO bearing 4 of FIG. 1 could be located in the same housing portion 1B as is bearing 13; likewise three separate housings or casing portions could be utilized for the embodiment 100 of the present invention.

Although the preferred embodiment of the present invention has been described by way of example with a certain degree of particularity, it is understood that the parts of the present invention may be modified and/or rearranged without departing for the spirit and the scope of the invention as hereinafter claimed.

I claim:

1. A PTO engagement mechanism (100) comprising a housing (1, 1B), a PTO input gear (2) mounted on bearings in said housing for relative axial and rotational movement, a piston (26) axially fixed to the gear and including a face subject to pressure in a pressure chamber (20) formed at the end of a feed shaft (18), fluid pressure in said chamber effective to axially displace said piston until a meshing part (10) of the gear meshes with a cooperatingly meshing part (11) of an input shaft (12), said feed shaft (18) passing through a central bore in the gear, a conduit in the feed shaft (18) effective to introduce pressurized fluid to and exhaust pressurized fluid from the pressure chamber and a return bias means (23) acting to resist engaging movement of the gear (2); said mechanism characterized in that the feed shaft is axially and rotationally fixed in the housing (1, 1B), the gear axially slides over and rotates relative to the feed shaft with an intervening seal (28) able to accommodate such relative movement, and the return bias means (23) acts directly on the piston (26).

2. The mechanism of claim 1 wherein the return bias means is a coilspring (23) which acts between the piston (26) and the end (35) of a recess in a part fixed to the input shaft (12).

3. The mechanism of claim 2 wherein said recess is a blind bore (12A) in said input shaft in which a portion of said coil spring is received, one end of said coil spring acting against a bearing (36).

4. The mechanism of claim 2 wherein a portion of the housing (1) remote the input shaft (12) accommodates an axial extension (5) of the gear (2), particularly with the latter in its disengaged axial position, together with a bearing (6) supporting the sliding and rotation at this axial extension (5); and characterized in that this portion of the housing has a re-entrant portion (34) arranged to support and secure the feed shaft (18) nonrotatingly at a region axially generally adjacent said axial extension (5) of the gear (2).

5. The mechanism of claim 3 wherein a portion of the housing (1) remote the input shaft (12) accommodates an axial extension (5) of the gear (2), Particularly with the latter in its disengaged axial position, together with a bearing (6) supporting the sliding and rotation at this axial extension (5); and characterized in that this portion of the housing has a re-entrant portion (34) arranged to support and secure the feed shaft (18) nonrotatingly at a region axially generally adjacent said axial extension (5) of the gear (2).

6. The mechanism of claim 2 wherein said pressurized fluid is compressed air.

* * * * *